United States Patent
Lin

(10) Patent No.: US 9,617,445 B2
(45) Date of Patent: Apr. 11, 2017

(54) UV CURABLE METALLIC DECORATIVE COMPOSITIONS

(71) Applicant: Actega Kelstar, Inc., Delran, NJ (US)

(72) Inventor: Anshyang Albert Lin, Raritan, NJ (US)

(73) Assignee: ACTEGA NORTH AMERICA, INC., Delran, NJ (US)

( * ) Notice: Subject to any disclaimer, the term of this patent is extended or adjusted under 35 U.S.C. 154(b) by 267 days.

(21) Appl. No.: 14/377,338

(22) PCT Filed: Jan. 23, 2013

(86) PCT No.: PCT/US2013/022714
§ 371 (c)(1),
(2) Date: Aug. 7, 2014

(87) PCT Pub. No.: WO2013/119387
PCT Pub. Date: Aug. 15, 2013

(65) Prior Publication Data
US 2015/0344722 A1    Dec. 3, 2015

Related U.S. Application Data

(60) Provisional application No. 61/595,859, filed on Feb. 7, 2012.

(51) Int. Cl.
| | |
|---|---|
| *C09D 133/08* | (2006.01) |
| *C09D 11/00* | (2014.01) |
| *C09D 11/101* | (2014.01) |
| *C09D 11/02* | (2014.01) |
| *C09D 11/32* | (2014.01) |

(Continued)

(52) U.S. Cl.
CPC ........... *C09D 133/14* (2013.01); *B05D 3/067* (2013.01); *C09D 4/00* (2013.01); *C09D 5/004* (2013.01); *Y10T 428/31507* (2015.04); *Y10T 428/31667* (2015.04); *Y10T 428/31692* (2015.04); *Y10T 428/31797* (2015.04); *Y10T 428/31895* (2015.04); *Y10T 428/31909* (2015.04);
(Continued)

(58) Field of Classification Search
CPC .......... C09D 133/14; C09D 4/00; C09D 4/06; C09D 5/04; C09D 5/00; C09D 5/38; C09D 5/004; C09D 133/08; C09D 11/00; C09D 11/101; C09D 11/102; C09D 11/32
See application file for complete search history.

(56) References Cited

U.S. PATENT DOCUMENTS

| | | |
|---|---|---|
| 4,097,639 A | 6/1978 | Millar |
| 4,233,195 A | 11/1980 | Mills |

(Continued)

FOREIGN PATENT DOCUMENTS

| | | |
|---|---|---|
| CA | 2 565 060 | 11/2005 |
| CN | 1477168 A | 2/2004 |

(Continued)

*Primary Examiner* — Sanza McClendon
(74) *Attorney, Agent, or Firm* — Ladas & Parry LLP

(57) ABSTRACT

The invention provides an ultraviolet light curable metallic composition, and articles made therewith. The UV-curable metallic compositions provide a high gloss metallic finish, retain the gloss level over storage duration, and maintain press and shelf stability, while maintaining fast cure speeds. The metallic finishes of the instant compositions have gloss above 190 GU measured at 60°.

24 Claims, 4 Drawing Sheets

Figure 1A: One Configuration of UV Metallic Coating and Top Coating

(51) Int. Cl.

| | | |
|---|---|---|
| | *C09D 5/00* | (2006.01) |
| | *C09D 133/14* | (2006.01) |
| | *B05D 3/06* | (2006.01) |
| | *C09D 4/00* | (2006.01) |
| | *C09D 5/33* | (2006.01) |

(52) U.S. Cl.
CPC .................. *Y10T 428/31913* (2015.04); *Y10T 428/31938* (2015.04)

(56) References Cited

U.S. PATENT DOCUMENTS

| | | |
|---|---|---|
| 4,321,087 A | 3/1982 | Levine et al. |
| 4,900,763 A | 2/1990 | Kraushaar |
| 6,805,917 B1 | 10/2004 | Krohn |
| 7,837,777 B2 | 11/2010 | Ikeya et al. |
| 2007/0249750 A1* | 10/2007 | Oyanagi ............ C09D 11/101 522/84 |
| 2008/0131383 A1 | 6/2008 | Kruger et al. |
| 2009/0139435 A1* | 6/2009 | Hertz .................. C04B 41/009 106/712 |
| 2010/0064938 A1 | 3/2010 | Voit et al. |
| 2010/0151139 A1 | 6/2010 | Low et al. |
| 2012/0148833 A1* | 6/2012 | Cao ........................ B05D 3/067 428/334 |

FOREIGN PATENT DOCUMENTS

| | | |
|---|---|---|
| EP | 1 980 597 A1 | 10/2008 |
| WO | WO 01/40387 A2 | 6/2001 |
| WO | WO 01/64793 A2 | 9/2001 |
| WO | WO 2007/041133 A2 | 4/2007 |
| WO | WO 2012/006199 A1 | 1/2012 |

* cited by examiner

Figure 1A: One Configuration of UV Metallic Coating and Top Coating
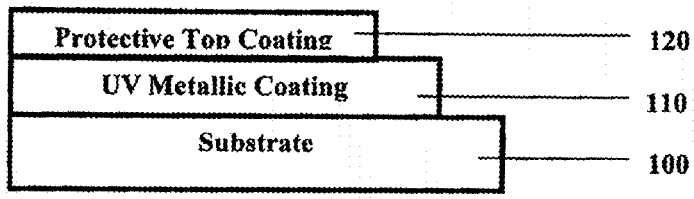
Figure 1B: A Second Configuration of UV Metallic Coating, Ink/paint and Top Coating
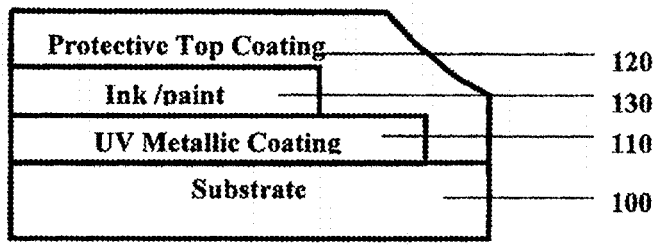
Figure 1C: Process Flow for UV Metallic Coating
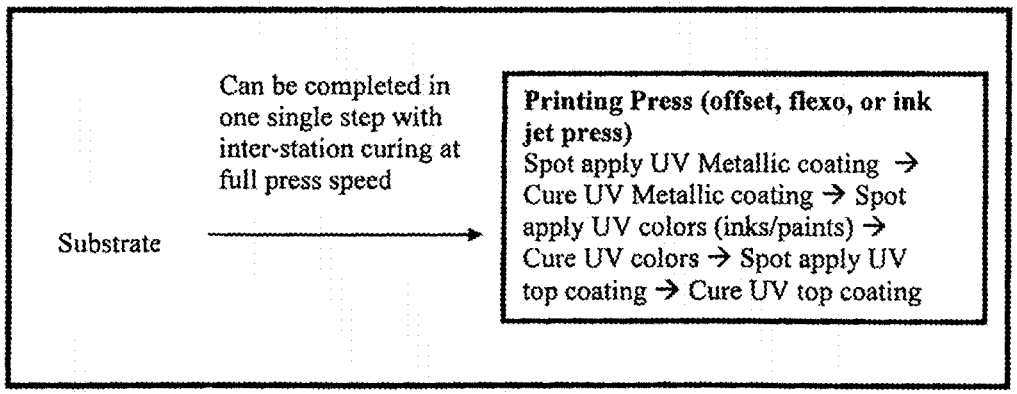

Figure 2A: Cross Sectional View of Conventional Hot Foil Stamping
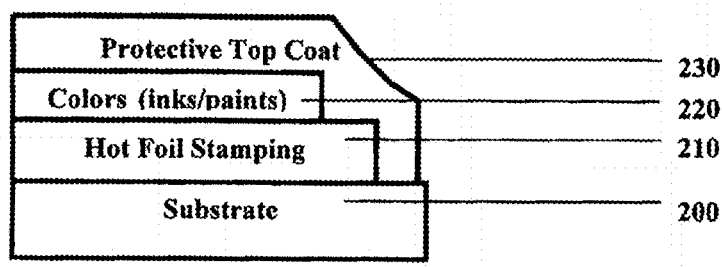
Figure 2B: Process Flow for Conventional Hot Foil Stamping
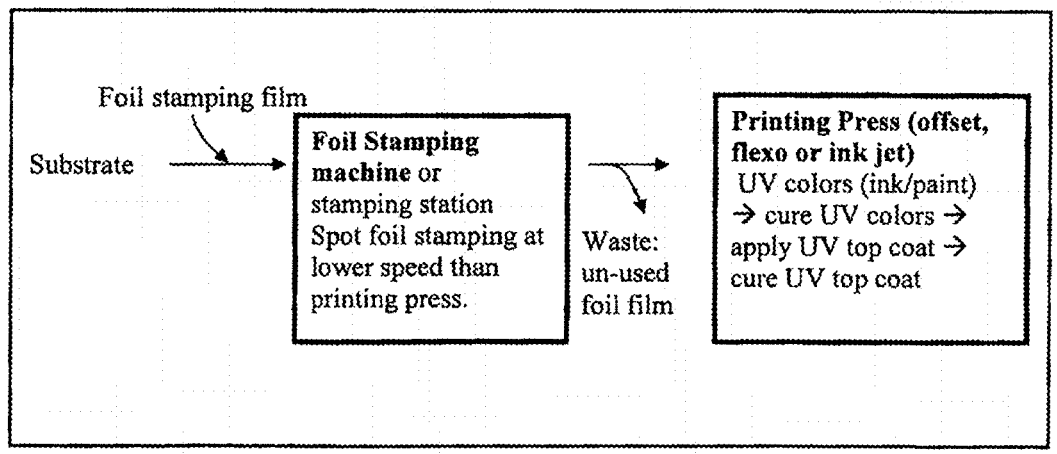

Figure 3A: Cross Sectional View of Conventional Lamination
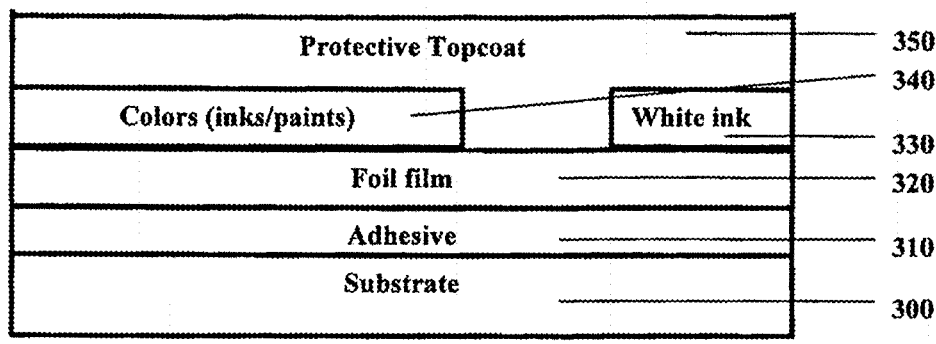
Figure 3B: Process Flow for Conventional Lamination
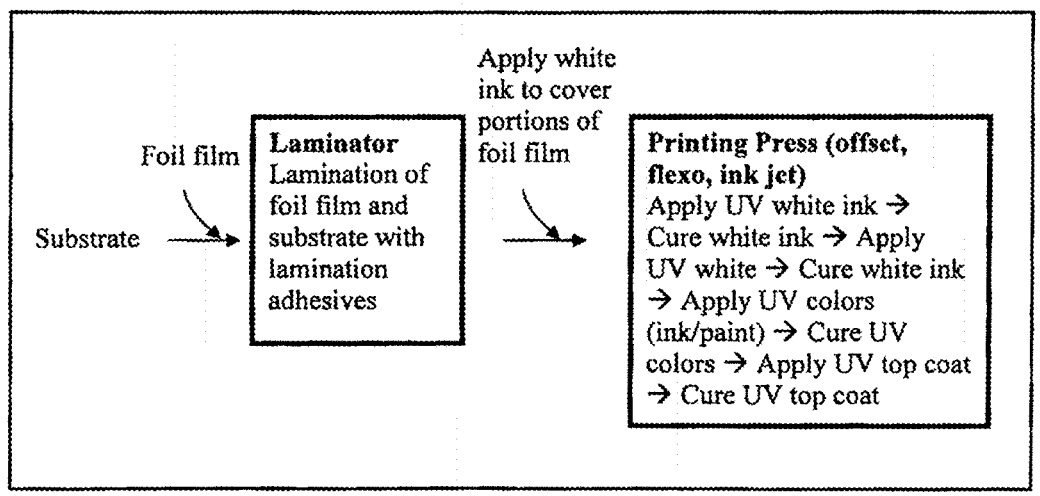

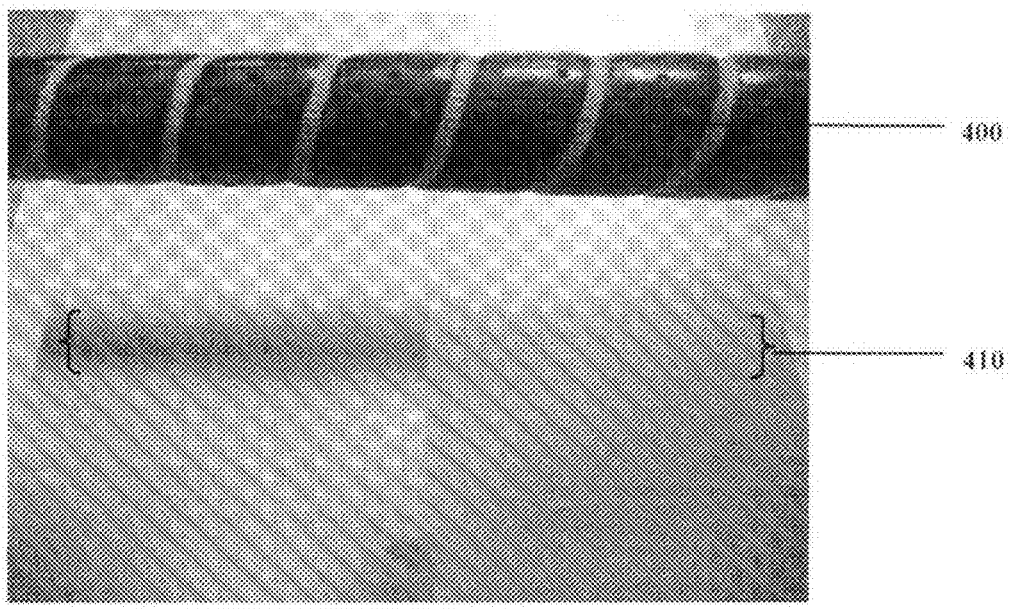
Figure 4: Photographic Images of Example 3 (left) and Comparative Example 2 (right)

UV CURABLE METALLIC DECORATIVE COMPOSITIONS

FIELD OF THE INVENTION

The present invention relates to ultraviolet light curable compositions that form high gloss decorative metallic appearance on various substrates.

BACKGROUND OF THE INVENTION

Bright metallic finishes are used in applications requiring a high degree of reflection over wide wavelengths. These finishes are typically used in decorations and ornamentations for aesthetic value. Packages with these brilliant metallic finishes outperformed those without metallic enhancement in 80% of the test cases in marketing study (Brand Packaging, Jan. 1, 2004).

It is often desirable to spot metallize (also known as spot application) a portion of a package. The metallic finishes are typically transferred from a two-dimensional sheet or web of metallized films, metallized papers or metallized foil onto the packages. However, creating spot metallization from the two-dimensional sheet creates wastes and additional steps. In one method, the metallized film is hot-stamped on designated areas of the package. In another method, the entire surface of the package is first covered with the two dimensional metallized film, and then portions of the metallic area is covered with a layer or layers of high opacity white ink to coat over the metallized portions. Both of these methods increase the overall cost, time and waste.

Alternatively, metallic particles are incorporated in a solvent-based binder system. However, solvent-based metallic coatings are not preferred in high production and large scale operations because they must be physically dried or heat cured, often incurring large amounts of energy, time and cost. Mills (U.S. Pat. No. 4,233,195) teaches a metallic ink composition; however, this composition is a pasty solvent-based ink that must be applied through an offset ink station at 300° F. heated roller to create a metallic paper. Kruger et. al., (US 2008/0131383), describe an in-situ solvent-based resin binder system that includes physical vapor deposition aluminum flake and a leafing additive to form artificial nails; however, the resin binder system must be physically dried to form the metallic effects. Volt et. al., (US 2010/0064938), describe a water polymer and/or organic binder solvent system containing silver-dollar leafing aluminum and an organofunctional silane to create a high brilliant metallic finish. Again, this is a solvent and water based system, which must undergo a drying process.

Maintaining high gloss for metallic surfaces can be challenging in a water based system. Low et al., (US 2010/0151139) describe an aqueous polyurethane based metallic coating that can be physically and/or thermally curable with PVD aluminum flakes. However, the gloss level is less than 104 gloss units (GU), which is less than high brilliant finish (typically 190 GU or higher as measured with a 60 degrees gloss meter).

While a system without physical drying or thermal curing is desirable, a balance of fast cure speed and shelf-stability is a challenge, especially for aluminum and copper metal flakes. Ikeya et al., (U.S. Pat. No. 7,837,777) describe the use of nitrocellulose to provide shelf stability and to stop premature gellation for a surface treated metal flakes in a UV-curable metallic inks, but nitrocellulose fails to contribute to cure speed enhancement.

To date, only a limited number of combinations of components are known to create a high gloss metallic effect for UV curable composition. Krohn (U.S. Pat. No. 6,805,917) teaches a UV-curable system that utilizes Novolac epoxy acrylate with isobonyl acrylate and isobonyl methacrylate. A flow additive, ethyl acrylate/2-ethylhexyl acrylate copolymer (Modaflow), is further added to metallic pigments. While the cure speed of the composition is adequate due to high initiator loading, Krohn is silent as to the gloss measurement of the finish.

There remains a need in the art for energy-efficient and environmentally-friendly metallic compositions, which are UV-curable in high speeds, shelf-stable, and can be cured to high gloss levels. The current invention fulfils this need.

BRIEF SUMMARY OF THE INVENTION

It has been discovered that the instant UV-curable metallic compositions provide a high gloss level of metallic finish, retain the gloss level over the storage duration, and maintain press and shelf stability, while maintaining cure speeds similar to those of non-metallic UV-curable compositions. The metallic finishes of the instant cure compositions are similar in gloss (brilliancy/reflectivity) to those of foil-like finishes.

In one aspect, the UV curable metallic decorative composition comprises (a) a plurality of a leafing metallic pigment flakes; (b) an acrylate oligomer and/or an acrylate monomer; (c) a initiator or mixture of initiators; and (d) a cure accelerator that is a tertiary amine with a structure of:

wherein $R^1$ and $R^2$ are independently, an aliphatic and/or aromatic substituent, and Y is an electron withdrawing substituent. In one embodiment, Y is a substituted benzene substituent with an electron withdrawing substituent. In another embodiment, Y is a benzoate.

In another aspect, the cured UV curable metallic decorative composition has a gloss level of above 190 GU at 60 degrees angle, as measured in accordance with ASTM D523, D2457, DIN 67530 or JIS Z8741. In another embodiment, the cured UV curable metallic decorative composition has a gloss level of above 65 GU at 20 degrees angle, as measured in accordance with ASTM D523, D2457, DIN 67530 or JIS Z8741.

Another aspect is directed to a UV-curable top coating composition that overlays at least a portion of the cured UV curable metallic decorative composition. In one embodiment, the UV-curable top coating composition comprises (1) an acrylate oligomer; (2) an acrylate monomer; (3) a photoinitiator or a mixture of initiators (4) a conventional cure synergist; and (5) an additive selected from the group consisting of wetting agent, defoamer, slip agent, stabilizer, optical brightener, dye, and pigment dispersion. In another embodiment, the UV-curable top coating composition is a water-based top coating, comprising (1) an acrylate oligomer that is water-dispersible, water-emulsified acrylate oligomer or polymer; (2) a water dispersible initiator; (3) an additive selected from the group consisting of wetting agent, defoamer, antioxidant, optical brightener, dye, and pigment dispersion; (4) an optional water dispersible or water soluble monomer.

Another aspect is directed to an article comprising a cured UV-curable decorative coating composition on a substrate.

In another aspect, the invention is directed to an article comprising a cured UV curable metallic decorative coating composition and a cured top coating composition, wherein the cured metallic decorative coating composition is coated on at least a portion of the surface of a substrate, and the cured top coating is coated on at least a portion of the surface of the cured metallic decorative coating surface.

In another aspect, the invention is directed to an article comprising a cured UV curable metallic decorative coating composition on at least a portion of the surface of a substrate, and a cured top coating that is coated on at least a portion of the surface of the cured UV curable metallic decorative coating composition. The UV curable top coating may be applied in multiple layers, where some layers include a colorant.

Yet another aspect is directed to a method of fabricating a metallic-finished article. The steps include (1) applying a UV-curable metallic composition on a substrate, (2) curing the UV-curable metallic composition. Optional steps include (3) applying a UV curable top coating with a colorant to at least a portion of the surface of the cured UV curable metallic composition and (4) curing or drying the colorant layer. In another embodiment, additional optional steps include (5) applying a second UV-curable top coating composition on at least a portion of the surface of the cured metallic composition and/or the surface of the cured colorant layer; and (6) curing the second UV-curing the top coating composition.

BRIEF DESCRIPTION OF THE DRAWINGS

FIGS. 1A and 1B show cross sectional views of spot coating substrate with UV metallic coating, protective top coating and optional color treatments. FIG. 1C shows the method of fabricating a metallic-finish article.

FIG. 2 shows a conventional hot foil stamping techniques utilized in spot metallization.

FIG. 3 shows a conventional foil film lamination technique creating spot metallization effect.

FIG. 4 is a photographic image of cured UV curable metallic compositions.

DETAILED DESCRIPTION OF THE INVENTION

All references cited are incorporated herein.

The UV curable metallic decorative composition comprises (a) a plurality of a leafing metallic pigment flakes; (b) an acrylate oligomer and/or an acrylate monomer; (c) an initiator or mixture of initiators; and (d) a cure accelerator that is a tertiary amine with a structure of:

$R^1R^2N-Y$ wherein $R^1$ and $R^2$ are independently, an aliphatic and/or aromatic substituent, and Y is an electron withdrawing substituent.

In one embodiment, the cured UV curable metallic decorative compositions have a 60 degree gloss level greater than 190 GU, more preferably greater than 200 GU, measured in accordance with ASTM D523, ASTM D2457, DIN 67530 or JIS Z8741. In another embodiment, the cured UV curable metallic decorative compositions have a 20 degree gloss level greater than 65 GU, more preferably greater than 70 GU, measured in accordance with ASTM D523, ASTM D2457, DIN 67530 or JIS Z8741. The gloss level of the cured UV curable metallic decorative compositions rival those of conventional metallic finishes, including foil board, metallized paper, hot foil stamping, and the like, which also have a gloss level greater than 190 GU.

The basis for the bright metallic finishings and coatings are metal particles, including, for example aluminum, zinc, copper, sliver, gold, nickel, titanium, and stainless steel and alloys of these metals. Aluminum is often chosen for silver metallic finishes and coatings for its excellent reflectance over a wide optical spectrum, including from UV to infrared. Similarly, copper and copper alloys are typically chosen for gold metallic finishes and coatings for their excellent reflectance. The highly reflective particles include powders, flakes and/or platelets (hereinafter referred to as "flakes"). The metal particles generated from the atomization process of molten metal may be further formed by conventional ball milling process to form shape known in the industry as "cornflake," "silver dollar" and "mini-silver dollar."

Aluminum flakes can also be generated by physical vapor deposition PVD (Physical Vapor Deposition) or VMP (Vacuum Metallized Process). Aluminum flakes formed by these means are thinner, have higher brilliance, and have higher reflectivity than those made by the conventional ball mill process. Also, these flakes form a micron size thin platelet shape and their packing structure is defined by x-ray diffraction method to be different from flakes form by conventional methods, as described in US 2010/0047199A1. While higher throughput of such PVD aluminum flakes makes commercial production feasible (US 2004/0146642), the resulting aluminum flakes are predominantly supplied in a solvent-based dispersion, and used for solvent-based metallic coating where physical drying and/or heat curing is still required.

The surface treatment further determines the behavior of the metal particles/flakes distribution, as either leafing or non-leafing, in bulk matrix. Typical surface treatments include fatty acids, phosphorous compounds, silianes, and aliphatic amines for metallic pigments. Surface treatment of metal flakes with stearic acid, for example, produces metallic flakes with high interfacial surface tension and hinders the binder from wetting out, and as a result, leafing metallic flakes rise to the surface during the drying process and form a scale-like, shinny metallic finish. Non-leafing pigments are created, for example, with the use of an oleic acid during the milling process. The metal flakes can be "wet out" by the binder, and therefore, are uniformly distributed in the dried or cured matrix. The non-leafing metallic flakes result in a "dull," non-shinny metallic finish. Various treatments to form leafing and non-leafing pigments are described in U.S. Pat. Nos. 4,629,512, 4,486,225, US 2004/0226480, US 2010/0269733, U.S. Pat. No. 4,565,716, US 2011/0094412A1, U.S. Pat. No. 7,837,777 and Metallic Effect Pigments-Fundamentals and Applications," Vincentz Network, ISBN 3-87870-171-3 (2006).

Preferred metal particles include leafing aluminum flakes, mixtures of PVD leafing aluminum flakes of various flake thickness and treatments, mixtures of PVD leafing and conventional ball-mill leafing aluminum flakes for silver metallic finishes. Preferred metal particles also include leafing copper and/or copper alloy flakes, for gold metallic finishes.

The UV curable metallic decorative compositions contain from about 0.1 to about 20 wt % of metallic flakes, more preferably from about 0.5 to about 15 wt %, and even more preferably from about 1 to about 12 wt %, based on the total solid weight of the composition.

Acrylate monomers useful for the UV-curable metallic compositions include mono-functional, di-functional, tri-functional and multi-functional acrylate monomers. Exemplary mono-functional acrylate monomers include, but not limited to, octyl acrylate, decyl acrylate, tridecyl acrylate, 2-phenoxyethyl acrylate, isobornyl acrylate, 2(2-ethoxyethoxy)ethyl acrylate, nonylphenoe acrylate, ethoxylated nonylphenol acrylate, stearyl acrylate, tetrahydrofurfuryl acrylate, aliphatic acrylate (Ebecryl 113, Cytec Industries Inc.), caprolactone acrylate, lauryl acrylate, cyclic trimethylolpropane formal acrylate, and the like. Exemplary di-functional acrylate monomers include, but not limited to, tripropylene glycol diacrylate, dipropylene glycol diacrylate; 1,6 hexanediol diacrylate; ethoxylated hexanediol diacrylate; 1,3-biutanedial diacrylate; 1,4-butanediol diacrylate; neopentyl glycol diacrylate; propoxylated neopentyl glycol diacrylate; diethylene glycol diacrylate; triethylene glycol diacrylate; tetraethylene glycol diacrylate; polyethylene glycol-200-diacrylate; polyethylene glycol-400-diacrylate; polyethylene glycol-600-diacrylate; 3-ethoxylated bisphenol-A diacrylate; 4-ethoxylated bisphenol A diacrylate; 10-ethoxylated bisphenol-A diacrylate; and the like. Exemplary tri-functional acrylate monomers include, but not limited to, trimethyol propane triacrylate, ethoxylated trimethyol propane triacrylate, 6-ethoxylated trimethyol propane triacrylate, 9-ethoxylated trimethyol propane triacrylate, 15-ethoxylated trimethyol propane triacrylate, 20-ethoxylated trimethyol propane triacrylate, propoxylated trimethylol triacrylate, propoxylated glyceryl triacrylate, pentaerythritol triacrylate, and the like. Exemplary multifunctional acrylate monomers include, but not limited to, pentaerythritol tetraacrylate, di-trimethylol propane tetraacrylate, di-pentaerythritol pentaacrylate, and the like.

Acrylates containing carboxylic acid (such as acrylic acid, e.g., CD9051, CD9051 from Sartomer; UCB Ebecryl 168, Ebecryl 170 from Cytec Industries Inc.), tertiary amines that contains electron donating substituents on the nitrogen (e.g., Ebecryl P104, P105, Ebecryl 7100 from Cytec Industries Inc.) and metallic acrylates (e.g., SR633, SR635, SR636, SR705, SR706, SR708, SR709, SR9016 from Sartomer) should be avoided since they would tarnish aluminum and copper metallic flakes.

Preferred acrylate monomers for UV-curable metallic compositions include 2-phenoxyethyl acrylate, isobornyl acrylate, stearyl acrylate, tetrahydrofurfuryl acrylate, aliphatic acrylate (Ebecryl 113 from Cytec Industries, Inc.), tripropylene glycol diacrylate, dipropylene glycol diacrylate; 1,6 hexanediol diacrylate, ethoxylated hexanediol diacrylate; 1,4-butanediol diacrylate; neopentyl glycol diacrylate; propoxylated neopentyl glycol diacrylate; 4-ethoxylated bisphenol A diacrylate; trimethyol propane triacrylate; ethoxylated trimethyol propane triacrylate; propoxylated glyceryl triacrylate, pentaerythritol triacrylate, di-trimethylol propane tetraacrylate.

The UV-curable metallic compositions further comprise an acrylate oligomer with epoxy, polyester, urethane or acrylic backbones. Preferably, this acrylate oligomer component is an acrylate terminated oligomer with film-forming properties and does not contain any carboxylic acid, amine, and silicones functional groups. For example, and without limitation, the oligomer of this embodiment can be an acrylate oligomer such as a polyester acrylate oligomer with a plurality of acrylate functional group per oligomer molecule. In some embodiments, the acrylate oligomer can have two to six acrylate sequences per oligomer molecule.

Examples of epoxy acrylate oligomers include, but are not limited to, bisphenol-A epoxy diacrylate (Ebecryl 3700, Ebecryl 3720 from Cytec Industries Inc.; CN120, CN104 from Sartomer), modified bisphenol-A epoxy diacrylate (Ebecryl 3701 from Cytec Industries Inc.), epoxy acrylate (CN121, CNUVE151 from Sartomer), UVE2200 epoxy acrylate (from Polymer Technologies, Ltd.) and the like.

Examples of acrylic acrylate oligomers include, but not limited to, CN2285 and CN549 from Sartomer. Typically, epoxy acrylate oligomers are available in a mixture with an acrylate monomer, wherein the oligomer is the major (typically greater than 50 weight percent) component of the mixture. Examples of polyester acrylate oligomers include, but are not limited to, CN292, CN293, CN704, CN710, CN2200, CN2203, CN2270, CN2262, CN2283, and CN2298 from Sartomer; and Ebecryl 40, Ebecryl 810 Ebecryl 885, Ebecryl 888 from Cytec Industries Inc.; and the like. Examples of urethane acrylate oligomers include, but are not limited to, aromatic urethane acrylate (Ebecryl 4827, Ebecryl 4849 from Cytec Industries Inc.), aromatic urethane hexa-acrylate (Ebecryl 220), aliphatic urethane diacrylate (Ebecryl 230, Ebecryl 270, Ebecryl 284, Ebecryl 4883, Ebecryl 8210, Ebecryl 8301 from Cytec Industries Inc.; CN9009, CN9024, CN966, from Sartomer. One example of acrylic Acrylate oligomer is Ebecryl 745 from Cytec Industries Inc., and CN704, CN711, CN821, CN822 from Sartomer.

Preferred acrylate oligomer components include bisphenol-A epoxy diacrylate, UVE2200 modified epoxy acrylate, and various monomer dilutions thereof and.

Also preferred are polyester acrylate oligomers including CN2203, CN2262, CN2283, CN2298, Ebecryl 40, Ebecryl 810; aromatic urethane acrylate Ebecryl 4849, Ebecryl 220; aliphatic urethane diacrylate, Ebecryl 8210, and various monomer dilutions thereof.

The UV-curable metallic compositions further comprise a photoinitiator. One or mixtures of photoinitiators may be used in the UV-curable metallic compositions to produce fully cured compositions. Examples of photoinitiator include, but not limited to, benzophenone, 4-methyl benzophenone, liquid benzophenone (eutectic mixture of benzophenone and methyl benzophenone), 4-phenylbenzyophenone, methyl-2-benzoylbenzoate, 2-hydroxy-2-methyl-1-phenyl-1-propanone, 1-hydroxy-cyclohexyl-phenyl-ketone, a mixture benzophenone and 1-hydroxy-cyclohexyl-phenyl-ketone (Irgacure 500 from Ciba); 2,2-dimethoxy-2phenyl acetophenone/benzyldimethyl ketal; methylbenzoylformate; 2-hydroxy-1[4-(2-hydroxyethoxy)phenyl]-2-methyl-1-propanone; dimethylhydroxy acetophenone; 1-[4-(1,1-dimethylethyl)phenyl]-2-hydroxy-2-methylpropan-1-one (Chivacure 2173 from Chitec. Technology); 2,4,6-trimethylbenzoyl phosphine oxide; ethyl (2,4,6-trimethylbenzoyl)phenylphosphinate; phenyl bis(2,4,6-trimethyl benzoyl)phosphine oxide; a mixture of 2,4,6-trimethylbenzoyl phosphine oxide and 2-hydroxy-2-methyl-1-phenyl-1-propanone (Daracur 4265 from Ciba); a 25/75 blend of bis(2,6-dimethoxybenzoyl)-2,4,4-trimethylpentylphosphine oxide and 2-hydroxy-2-methyl-1-phenyl-1-propanone; a 20/80 blend of phenyl bis(2,4,6-trimethyl benzoyl)phosphine oxide and proprietary phosphine derivative; a mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester; oligo(2-hydroxy-2-methyl-1-(4-(1-methyl vinyl)phenyl) propanone) (Esacure one from Lamberti); oligo[2-hydroxy-2-methyl-1-[4-(1-methylvinyl)phenyl]propanone] (Esacure KIP150 from Lamberti); 1-propanone, 1-[4-[(4-benzoylphenyl)thio]phenyl]-2-methyl-2-[(4-methylphenyl)sulfonyl] (Esacure 1001 from Lamberti); poly {1-[4-(phenylcarbonyl)-4'-(methyldiphenylsulphide)]ethylene} (Speedcure 7003 from Lambson); a mixture of: 1,3-di({α-2-(phenylcarbonyl)benzoylpoly[oxy(1-methylethylene)]}oxy)-2,2-bis ({α-2-phenylcarbonyl)-benzoylpoly[oxy(1-methylethylene)]}oxymethyl) propane and {α-2-(phenylcarbonyl) benzoylpoly(oxyethylene)-poly[oxy(1-methyl-ethylene)]- poly(oxyethylene)}2-(phenylcarbonyl)benzoate (Speedcure 7005 from Lambson); poly{1-[4-(phenylcarbonyl)phenyl]ethylene} (Speedcure 7006 from Lambson); poly{1-[4-(phenylcarbonyl)-4'-(chlorophenyl)]ethylene} (Speedcure 7020 from Lambson); polymeric benzophenonic derivative (Genopol BP-1); and mixtures thereof.

In conjunction with the above mentioned initiators, cure initiators designed for pigmented UV systems may be used in the UV-curable metallic compositions. Exemplary initiators for pigmented system include isopropylthioxanthone; 2,4-diethylthioxanthone; 1-chloro-4-propoxythioxanthone; bis(p-(N,N-dimethylamino)phenyl)ketone (Michler's ketone); 2-benzyl-2N,N-dimethylamino-1-(4-morpholinophenyl)-1-butanone; 2-(4-Methylbenzyl)-2-dimethylamino-1-(4-morpholinophenyl)-1-butanone; 1-butanone, 2-(dimethylamino)-1-[4-[(2-hydroxyethyl)methylamino]phenyl]-2-(phenylmethyl) (R-Gen 988 form Chitec); 2-methyl-1-[4-(methylthio)phenyl]-2-morpholino propan-1-one; 4-(p-tolythio)benzophenone; 1,3-di({α-[1-chloro-9-oxo-9H-thioxanthen-4-yl)oxy]acetylpoly[oxy(1-methylethylene)]}oxy)-2,2-bis({α-[1-chloro-9-oxo-9H-thioxanthen-4-yl)oxy]acetylpoly[oxy(1-methylethylene)]}oxymethyl) propane (Speedcure 7010 from Lambson,); polybutyleneglycol bis(9-oxo-9H-thioxanthenyloxy)acetate (Genopol TX-1 from Rahn Ag); diester of carboxymethoxy thioxanthone and polytetramethyleneglycol 250 (Omnipol TX from IGM Resins); and mixtures thereof.

Preferred initiators includes benzophenone; 2-hydroxy-2-methyl-1-phenyl-1-propanone; 1-hydroxy-cyclohexyl-phenyl-ketone; 2,2-dimethoxy-2-phenyl acetonephenenone/benzyldimethyl ketal; 2,4,6-trimethylbenzoyl phosphine oxide; ethyl (2,4,6-trimethylbenzoyl)phenylphosphinate; phenyl bis(2,4,6-trimethyl benzoyl)phosphine oxide; a 20/80 blend of phenyl bis(2,4,6-trimethyl benzoyl)phosphine oxide and various phosphine oxide derivatives; a mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester; isopropylthioxanthone; bis(p-(N,N-dimethylamino)phenyl)ketone (Michler's ketone); oligo[2-hydroxy-2-methyl-1-[4-(1-methylvinyl)phenyl]propanone] (Esacure KIP150 from Lamberti); 1-propanone, 1-[4-[(4-benzoylphenyl)thio]phenyl]-2-methyl-2-[(4-methylphenyl)sulfonyl] (Esacure 1001 from Lamberti); 2-(4-Methylbenzyl)-2-dimethylamino-1-(4-morpholinophenyl)-1-butanone; polybutyleneglycol bis(9-oxo-9H-thioxanthenyloxy)acetate (Genopol TX-1 from Rahn Ag); diester of carboxymethoxy thioxanthone and polytetramethyleneglycol 250 (Omnipol TX from IGM Resins) and mixtures thereof.

The UV-curable metallic compositions further comprise a cure accelerator. The cure accelerator of the UV-curable metallic composition is a tertiary amine with a structure of:

$R^1R^2N—Y$ wherein $R^1$ and $R^2$ are independently, an aliphatic and/or aromatic substituent, and Y is an electron withdrawing substituent. In one embodiment, Y is a substituted benzene substituent with an electron withdrawing group. In another embodiment, Y is a benzoate.

Preferred accelerators include ethyl 4-(dimethylamino) benzoate, 2-ethylhexyl-4-(dimethylamino)benzoate, ethyl 2-(dimethylamino)benzoate, n-butoxyethyl 4-(dimethylamino)benzoate; poly[oxy(methyl-1,2-thanediyl)], α-[4-(dimethylamino)benzyl-ω-butoxy (Speedcure PDA from Lambson); poly(ethyleneglycol)bis(p-dimethylamino benzoate) (Omipol ASA from IGM Resin); a mixture of 1,3-di({α-4-(dimethylamino)benzoylpoly[oxy(1-methylethylene)]}oxy)-2,2-bis({α-4-(dimethylamino)-benzoylpoly[oxy(1methylethylene)]}oxymethyl) propane and {α-4-(dimethylamino)benzoylpoly(oxyethylene)-poly[oxy(1-methylethylene)]-poly(oxyethylene)}4-dimethyl-amino) benzoate (Speedcure 7040 from Lambson); polymeric aminobenzoate derivative (Genopol AB-1 from Rhan USA); and mixtures thereof.

Conventional tertiary amine synergists differ from the tertiary amine cure accelerators. The conventional tertiary amine cure synergists contain an electron donating substituent on the nitrogen, whereas the tertiary amine cure accelerators contain an electron withdrawing substituent. Metal flakes are typically pre-treated with a surface treating agents such as amines, fatty acids, phosphorous compounds, and/or siliane. Thus, care should be taken to avoid further adding the aforementioned surface treating agents to prevent any adverse effect to the metals. Typically, the addition of a conventional tertiary amine synergist, such as methyldiethanol amine (MDEA), triethanol amine (TEOA), and amine acrylates (such as Ebecryl P104, Ebecryl P105, Ebecryl 7100 from Cytec Industries Inc. or their equivalent) to aluminum or copper containing UV curable composition negatively affects the metal brilliance and/or its stability (gels the composition, immediately or within several days), rendering the UV curable composition unusable. It is surprising that the addition of particular tertiary amine cure accelerator as described above, to a UV curable composition filled with aluminum or copper accelerates the cure speed, retains the high gloss finish (greater than 190 GU measured at 60° measured in accordance with ASTM D523, ASTM D2457, DIN 67530 or JIS Z8741) and allows for shelf-stability for at least several months. Without being bound to any particular theory, it is believed that the electron withdrawing group of the cure accelerator distributes the lone electron pair of the nitrogen in the cure accelerator, preventing metal oxidation reaction and premature polymerization reaction of acrylate compositions. It is also believed that the hydrogen groups from the adjacent carbon atom ($R^1$, $R^2$) enhance cure acceleration of the UV curing process.

Optional additives such as antioxidants, stabilizers, anti-misting agents, optical brighteners, slip agents such as waxes, fillers, and/or dyes can be added up to about 10 wt % of the curable coating composition. Solvents may also be added as an optional component to achieve a desired viscosity or thickness of the coating composition. Optional solvents such as ethanol, isopropyl alcohol, ethyl acetate, isopropyl acetate, 2-methoxy-1-methylethyl acetate, 1-methoxy-1-propanol, butyl glycol, methyl ethyl ketone, or other suitable solvents can be added to adjust the viscosity for specific application methods or for achieving low coating thickness.

The UV-curable metallic compositions may be formed by combining the solid and liquid components together. Heat and shear in the mixing can be adjusted to assure a uniform mixture. The viscosities of the compositions can be adjusted with a solvent to suit a particular application method and to obtain a desired application viscosity and thickness. Typically, the desirable viscosity is in the range of about 10 centipoise (cps) to about 100,000 cps at 25 to 40° C.

Gloss is the attribute of surfaces that causes the appearance to have shiny or lustrous, metallic or matte finish. Gloss effects are based on the interaction of light with the physical properties of the surface. The gloss of a surface can be greatly influenced by a number of factors, for example the smoothness and quality of the substrate, and the amount and type of coating applied. Gloss is measured by shining a known amount of light at a surface at a specific angle and quantifying the reflectance with a gloss meter. The measurement results are related to the amount of reflected light from a black glass standard with a defined refractive index, and not to the amount of incident light. The measurement value for this defined standard is equal to 100 gloss units (GU). Materials with a higher refractive index can have a measurement value above 100 GU.

The gloss of the cured UV-curable metallic compositions is greater than 190 GU measured at 60 degree with a gloss meter, measured in accordance with ASTM D523, D2457, DIN 67530 or JIS Z8741. With the gloss level greater than 190 GU, the UV-curable metallic composition gloss rivals foil board, metallized paper, and hot foil stamping. In another embodiment, the cured UV curable metallic decorative composition has a gloss level of above 65 GU at 20 degrees, as measured in accordance with ASTM D523, D2457, DIN 67530 or JIS Z8741. Gloss measured from the UV-curable metallic compositions that have been stored, for even up to three months, exceeded 190 GU (measured at 60 degrees, measured in accordance with ASTM D523, D2457, DIN 67530 or JIS Z8741). The UV-curable metallic composition is shelf-stable for at least up to two months, four months, and even up to six months.

Another aspect is directed to a UV-curable top coating composition that overlays at least a portion of the cured UV curable metallic composition. It is desirable to apply the top coating onto the cured surfaces to avoid disturbing the leafing effect of the metallic flake. Several layers of the top coating compositions may be applied onto the cured UV curable metallic composition. One of the top coating composition is a colorant layer. Various metallic shades and designs can be created by selecting an appropriate dye, pigments, inks or paints in the top coating composition as the colorant. The colorant is applied onto the surface of the cured UV curable metallic composition to form different metallic shade. For example, application of a colorant with a transparent yellow pigment onto a cured metallic composition made with aluminum flakes is visible as a gold shade on the metallic coating. The colorants can be dried or cured to give a desirable ornamental or design effect. In one embodiment, a second top coating composition overlays the colorant layer.

The top coating composition may be a non-water-based or a water-based UV curable coating. Depending upon the substrate, appropriate UV-curable top coating compositions are selected. Water-based top coating is preferred for plastic and metal substrates coated with metallic coatings. A better adhesion is formed at the interface of the two coatings with minimal swelling and shrinkage.

In one embodiment, the UV-curable top coating composition comprises (1) an acrylate oligomer and monomer mixture; (2) a photoinitiator that is compatible with the acrylate oligomer and monomer mixture; and (3) a conventional cure synergist; and optionally, (4) an additive selected from the group consisting of wetting agent, defoamer, antioxidants, stabilizers, anti-misting agents, optical brighteners, slip agents such as waxes, fillers, dye and pigment dispersion. Among others, conventional cure synergists include tertiary amines that contain electron donating substituent.

In another embodiment, the top coating composition is a water based UV curable coating comprising (1) an acrylate oligomer that is water-dispersible, water-emulsified acrylate oligomer or polymer; (2) a photoinitiator that is compatible with the acrylate oligomer/polymer; and (3) optionally an additive selected from the group consisting of wetting agent, slip agent, stabilizer, optical brightener, defoamer, dye and pigment dispersion; and (4) an optional water dispersible or water soluble monomer. As used herein, acrylate oligomers typically have a weight average molecular weight (Mw) less than about 5,000 and acrylate polymers typically have a weight average molecular weight (Mw) greater than about 5,000. Acrylate oligomers are recognized as having a film forming properties as having higher viscosities than monomers, which typically do not have film forming properties.

The water-dispersible acrylate oligomer generally contains a water dispersible component, such as a repeating ethoxylated unit —$(CH_2CH_2O)_n$— or an ionic functional group. Examples include: LR8765 from BASF, Desmolux XP2587 from Bayer Material Science; UVECOAT 6558 and 6590 from Cytec Industries Inc. Water-emulsified acrylate oligomer or water-emulsified acrylate polymer have the structure of

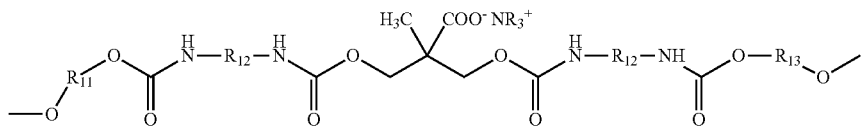

wherein $R_{11}$ is selected from the group consisting of polyester acrylate, epoxy acrylate or polyether acrylate, $R_{12}$ is a diisocyanate, $R_{13}$ is a diol. The acrylate functional group of $R_{11}$ is the reactive site. Water-emulsified acrylate oligomer/polymer include Bayhydrol UV 2282, 2317, VPLS2280, XP2629, XP2649, XP2661, XP2687, XP2689, XP2690, XP2720, XP2721, XP2736, XP2775 from Bayer Material Science; LUX250, LUX260, LUX286, LUX399, LUX430, LUX441, LUX481, LUX515, LUX701, LUX1215 from Alberdingk Boley; UVECOAT 7710, 7730, 7890, 7571, 7578, 7655, 7674, 7689, 7699 polyurethane dispersion from Cytec Industries Inc.; and mixtures thereof.

Preferred water emulsified acrylate oligomer/polymer dispersions include Bayhydrol XP2649, XP2690, XP2720, XP2736 from Bayer Material Science Material Science; LUX250, LUX260, LUX441, LUX399, and LUX481 from Alberdingk Boley; and mixtures thereof.

Compatible photoinitators are selected for the water-based UV-curable top coating compositions. The term "compatible" herein is defined as either soluble or dispersible in water diluted acrylate oligomer or water emulsified oligomer/polymer mentioned above without causing curd-like separation.

Exemplary water-soluble or water-dispersible liquid photoinitiators include 2-hydroxy-2-methyl-1-phenyl-1-propanone, a mixture benzophenone and 1-hydroxy-cyclohexyl-phenyl-ketone (Irgacure 500 from Ciba), ethyl (2,4,6-trimethylbenzoyl)phenylphosphinate; 50/50 mixture of 2,4,6-trimethylbenzoyl phosphine oxide and 2-hydroxy-2-methyl-1-phenyl-1-propanone (Daracur 4265 from Ciba); 25/75 blend of bis(2,6-dimethoxybenzoyl)-2,4,4-trimethylpentylphosphine oxide and 2-hydroxy-2-methyl-1-phenyl-1-propanone (Irgacure 1700); 20/80 blend of phenyl bis(2, 4,6-trimethyl benzoyl)phosphine oxide and a phosphine derivative (Irgacure 2100 from Ciba); a mixture of oxyphenyl-acetic acid 2-[2-oxo-2-phenyl-acetoxy-ethoxy]-ethyl ester and oxy-phenyl-acetic acid 2-[2-hydroxy-ethoxy]-ethyl ester (Irgacure 819W from Ciba); 20/80 mixture of phenyl bis(2,4,6-trimethyl benzoyl)phosphine oxide with 2-hydroxy-2-methyl-1-phenyl-1-propanone (Irgacure 2022 from Ciba); phenyl bis(2,4,6-trimethyl benzoyl)phosphine oxide dispersed in water (50 wt %/50 wt %); oligo(2-hydroxy-2-methyl-1-(4-(1-methyl vinyl)phenyl) propanone) in 75% in TMPEOTA (Esacure One 75 from Lamberti); and mixtures thereof. The photoinitiator may also be pre-dissolved in a miscible solvent, e.g., isopropyl alcohol, or a water dispersible/soluble acrylate monomer, and above mentioned liquid photoinitiator, and can be utilized as a compatible photoinitiator.

Preferred water-soluble or water-dispersible photoinitiators include 2-hydroxy-2-methyl-1-phenyl-1-propanone, a mixture benzophenone and 1-hydroxy-cyclohexyl-phenyl-ketone (Irgacure 500 from Ciba); 50/50 mixture of 2,4,6-trimethylbenzoyl phosphine oxide and 2-hydroxy-2-methyl-1-phenyl-1-propanone (Daracur 4265 from Ciba); 20/80 blend of phenyl bis(2,4,6-trimethyl benzoyl)phosphine oxide and a phosphine derivative (Irgacure 2100 from Ciba); 20/80 mixture of phenyl bis(2,4,6-trimethyl benzoyl)phosphine oxide with 2-hydroxy-2-methyl-1-phenyl-1-propanone (Irgacure 2022 from Ciba); a mixture of oxy-phenyl-acetic acid 2-[2-oxo-2-phenyl-acetoxy-ethoxy]-ethyl ester & oxy-phenyl-acetic acid 2-[2-hydroxy-ethoxy]-ethyl ester; ethyl (2,4,6-trimethylbenzoyl)phenylphosphinate; phenyl bis(2,4,6-trimethyl benzoyl)phosphine oxide dispersed in water (50 wt %/50 wt %) and mixtures thereof.

Another embodiment is directed to an article that comprises a substrate with a cured high gloss metallic coating and a cured top coating on top of the metallic coating. The gloss level of this article is greater than 160 GU measured at 60 degree angle in accordance with ASTM D523, D2457, DIN 67530 or JIS Z8741.

An article comprises, in one embodiment, a cured UV-curable metallic composition on at least a portion of the substrate surface of the article. In one embodiment, and as demonstrated in FIG. 1A, a substrate (100) is spot coated with a UV metallic coating (110), and further spot coated with a top coating, which also performs as a protective coating (120). In another embodiment, and as demonstrated in FIG. 1B, a UV curable top coating with transparent colors (paint/ink) (130) is spot coated or printed on the UV metallic coating (110), and a UV curable top coating (120) is applied over all area. Articles include packaging containers in a variety of shapes and sizes.

The UV curable metallic compositions allow for various print presses, e.g., offset printing, flexo-printing, gravure printing, silk screen, or inkjet presses, to be aligned to form a single pass process and with minimal or no waste. The UV metallic coating composition is spot applied by a print press and cured, a UV curable top coating with colors (ink/color) is spot applied by the same or different print press and cured, and a UV top coating is spot applied by the same or different print press and cured.

Unlike the fast curing UV curable metallic composition process, conventional hot foil stamping and foil film lamination techniques operate at lower speeds. Moreover, as shown in FIG. 2B, foil stamping generates waste from the non-transferred foil area. As shown in FIG. 3, foil film lamination requires portions of the metallic coating to be covered with an opaque white ink to create the spot metallization effect.

Substrates include paper, plastics, wood, composite wood and metals. The substrates may be in two- or three-dimensional configurations, and in more than one plane. The substrate may be substantially smooth two-dimensional surface or have plurality of surfaces, including rounded edges. For paper substrates, the paper may be a clay-coated or a primer-sealed paper. For plastic substrates, the plastic may be an oriented polypropylene, polystyrene, polyvinylchloride, polycarbonate, polyethylene, polyethylene terephthalate or acrylic.

In another embodiment, the article is formed by the steps of (1) applying a UV-curable metallic composition on at least a portion of a substrate surface, (2) optionally evaporating the solvent in the UV-curable metallic composition; (3) curing the UV-curable metallic composition.

In another embodiment, the article is formed by further comprising the steps of (4) applying a UV curable top coating with colorant on at least a portion of the surface of the cured metallic composition; and (5) curing or drying the colorant.

Yet in another embodiment, the article is formed by further comprising the steps of (6) applying a UV-curable top coating composition on at least a portion of the surface of the cured metallic composition and/or colorant; (7) optionally evaporating the solvent in the UV-curable top coating composition; and (8) UV-curing the top coating composition.

The UV-curable metallic composition, UV curable top coating composition with colorant, and UV-curable top coating composition may be applied with by various means. Applicators including all conventional application means such as offset printing, lithography printing, gravure printing, digital ink jet printing, flexographic printing, silk-screen printing, pad printing, roller coater, spraying, air brushing, spinning, dipping, and the like, by adjusting the viscosity and rheology of the metallic composition. Heat, alone or with air flow, can be used to evaporate the solvents or colorants in the article formation. Also, ultraviolet radiations, typically ranging from 50 mJ/cm$^2$ to 5 J/cm$^2$, by standard mercury lamp or doped mercury lamp or UV LED can be used to cure the compositions. Depending on the distance and the wavelength, the time for full cure ranges from millisecond to 5 minutes. The addition of the cure accelerator, as specified above, in the UV curable metallic composition, as specified above, allows the metallic composition to cure 20, 30 or even 35% faster than metallic compositions without the cure accelerator. Thus, the addition of the cure accelerator allows the UV curable metallic composition to cure at similar conditions and speeds as those of UV clear coatings and UV pigmented inks/paints.

EXAMPLES

The components of UV-curable metallic compositions are shown in Table 1. The base UV-curable metallic compositions were made by combining the oligomer, photoinitiators, additives, and the first two monomers in a stainless metal cup on a hot plate at 50° C. with saw tooth mixing blade mixer until the mixture dissolved, and then cooling the mixture to room temperature. The remaining components were added and mixed until uniform. Cure accelerators or conventional cure synergist was added in parts per hundred based on the base UV-curable metallic compositions (however, the addition of solid ethyl 4-(dimethylamino) benzoate in Example 3 was added in the heating step). The compositions were then applied onto a clay coated paper with a wire-wound rod #4 bar from Paul N. Gardner Co., Inc.

TABLE 1

UV-curable metallic compositions

| | Component | Com Ex 1 | Com Ex 2 | Ex3 | Ex4 |
|---|---|---|---|---|---|
| Acrylate oligomer | Ebecryl 3720TM40 (60% Bisphenol-A-epoxy diacrylate oligomer diluted in 40% TMPTA monomer) | | | 10.00 | |
| Acrylate monomer | Trimethylolpropane triacrylate (TMPTA) monomer (Cytec Industries Inc.) | | | 26.30 | |
| | di-trimethylol propane tetracrylate | | | 13.80 | |
| | Propoxylated (2) Neopentyl glycol diacrylate | | | 1.20 | |
| Photoinitiator | 2-hydroxy-2-methyl-1-phenyl-1-propanone | | | 4.62 | |
| | 1-hydroxy-cyclohexyl-phenyl-ketone | | | 1.26 | |
| | 2,4,6-trimethylbenzoyl phosphine oxide | | | 2.52 | |
| Additive | Hydroquinone monomethyl ether | | | 0.12 | |
| | Irgastab UV-10 (BASF) | | | 0.18 | |

TABLE 1-continued

UV-curable metallic compositions

| | Component | Com Ex 1 | Com Ex 2 | Ex3 | Ex4 |
|---|---|---|---|---|---|
| Metal Flake | Leafing PVD aluminum, 8% dispersed in Propoxylated (2) Neopentyl glycol diacrylate | | | 40.00 | |
| Conventional Cure Synergist | methyldiethanol amine (MDEA) | | 3 pph | | |
| Cure Accelerator | ethyl 4-(dimethylamino) benzoate (EDB) | | | 2 pph | |
| | 2-ethylhexyl-4-(dimethylamino) benzoate (EHA) | | | | 2 pph |

Table 2 shows the physical properties of the UV-curable metallic compositions, set forth in Table 1.

Viscosity was measured with a Brookfield Viscometer model LV using #3 spindle, 60 rpm at 25° C. immediately after the compositions were made, unless otherwise stated.

Metallic coating was applied onto a clay coated paper with a wire-wound rod #4 bar from Paul N. Gardner Co., Inc., unless otherwise stated.

The gloss reading was taken for draw-down sample cured at 100 mJ/cm$^2$. Gloss was measured at 60 and 20 degrees with a BYK micro-Tri-gloss Gloss Meter in accordance with ASTM D523, ASTM D2457, DIN 67530 or JIS Z8741.

The lowest smear-free cure dosage indicates the amount of cure dosage required to cure the composition to initial gel formation stage. This was determined by incrementally curing the composition at 5 mJ/cm$^2$ intervals and the cured surface was immediately rubbed with a finger for any smears. The cure dosage (speed) was calibrated with by UVICURE Plus II radiometer.

The total amount of aluminum was calculated by the amount of aluminum dispersion in total weight of the composition.

The appearance of the uncured and cured coatings was visually determined.

The stability of the uncured composition was determined measuring the time it took for the composition to gel or significantly change its viscosity. The uncured composition was left at room temperature in an amber glass bottle.

TABLE 2

Physical properties of the UV-curable metallic composition

| | Com Ex 1 | Com Ex 2 | EX 3 | Ex 4 |
|---|---|---|---|---|
| Brookfield Viscosity (cps) at 25° C. | 520-580 | 520-580 | 520-580 | 500-550 |
| 20 degree Gloss (Gloss Unit) | 77.4-80.9 | 16.2-20.9 | 70.9-77.0 | 69.6-72.6 |
| 60 degree Gloss (Gloss Unit) | 206-211 | 62-69 | 192-197 | 190-195 |
| Lowest smear-free cure dose, mJ/cm$^2$ | 80 | ND | 55 | 60 |
| Aluminum, % | 3.2 | 3.11 | 3.14 | 3.14 |
| Appearance (uncured and cured coating) | Lustrous | Turn grey immediately | Lustrous | Lustrous |
| Stability | Stable for greater than 3 months | gelled within 48 hours | Stable for greater than 3 months | Stable for greater than 3 months |

As shown in Table 2, Examples 3 and 4 had high gloss, low smear free cure dosage, and had shelf stability of greater than 3 months. Also, the lowest smear-free cure dose of the examples 3 and 4 is far lower than the comparative example 1. Thus, the UV curable metallic compositions can cure faster than those without the cure accelerator. Also, the addition of methyldiethanol amine (MDEA), a conventional cure synergist decreased gloss level, tarnished the coating appearance and decreased shelf-stability of the composition.

As shown in FIG. 4, Example 3 (left) had higher reflectivity than Comparative Example 2 (right). An object (400) is place atop of the two coating samples, and the luster or the reflectivity is visible by the shadow (410). As shown in the photograph, the object's shadow is more visible in Example 3 than in Comparative Example 2.

For Examples 5-8, a mixture of Ebecryl 3720 TP40, hexanediol diacrylate, ethoxylated trimethylol propane triacrylate, hydroquinone monomethyl ether, 2-hydroxy-2-methyl-1-phenyl-1-propanone, and ethyl (2,4,6-trimethylbenzoyl)phenylphosphinate and were combined in similar fashion to Examples 1-4. Additions of Modaflow and different leafing aluminums were added as described in Table 3, and the total amount of the composition was 100 wt %. The compositions were coated on clay coated paper using with a wire-wound rod #4 bar from Paul N. Gardner Co., Inc. The gloss reading was taken for sample cured at 100 mJ/cm$^2$. The liquid samples are stored in amber glass jars at room temperature for stability monitoring.

TABLE 3

UV-curable metallic compositions

| | Component | EX 5 | Ex 6 | EX 7 | Com EX 8 |
|---|---|---|---|---|---|
| Additive #2 | Modaflow (Cytec Industries Inc.) | — | — | — | 3.00 |
| Metal Flake #1 | Leafing PVD aluminum 20% dispersed in ethoxylated trimethyol propane triacrylate | 12.00 | 10.00 | 8.00 | 12.00 |
| Metal Flake #2 | Leafing conventional aluminum from ball mill process, 33% dispersion in propoxylated (2) neopentyl glycol diacrylate | — | 3.00 | 6.00 | — |
| Cure Accelerator | Ethyl 4-(dimethylamino) benzoate | 3.00 | 3.00 | 3.00 | — |
| | Total | 100.00 | 100.00 | 100.00 | 100.00 |

Table 4 shows the physical properties of the UV-curable metallic compositions of Table 3. Table 4 also indicates the percent of PVD aluminum.

TABLE 4

Physical properties of the UV-curable metallic composition

| | EX 5 | Ex 6 | EX 7 | Com EX 8 |
|---|---|---|---|---|
| Brookfield Viscosity (cP) | 610-620 | 360-370 | 390-400 | 350-360 |
| 20 degree Gloss, points | 101-130 | 112-121 | 82-87 | 53.2-58.7 |
| 60 degree Gloss, points | 276-279 | 224-238 | 170-172 | 110-118 |
| Lowest smear-free cure dose (mJ/cm$^2$) | 60 | 65 | 75 | — |
| Total Aluminum, % | 2.4 | 2.4 | 2.4 | 2.4 |
| PVD Aluminum, % | 2.4 | 1.8 | 1.2 | 2.4 |
| Appearance (liquid & cured coating) | lustrous | Reduced luster but acceptable reflectivity | Further reduced luster than Ex 6 & lighter in color | dull liquid & loss of aluminum flakes during printing due to agglomeration |
| Stability | Stable for more than 3 months | Stable for more than 3 months | Stable for more than 3 months | dull liquid within 24 hours |

As shown in Table 4, the decreasing the content of PVD aluminium generally decreases the gloss and negatively affects the appearance. It further indicates that substitution of less than 25% with conventional leafing aluminium would yield acceptable reflectivity: the gloss level is higher than 190 GU at 60 degree measurement. While U.S. Pat. No. 6,805,917 teaches the addition of Modoflow as a flow additive to improve flow and wetting, the addition of such additive destroyed the leafing effects of metal flakes and rendered the coating composition unusable.

The components of Example 9 are listed in Table 5. The viscosity of this composition was measured to be 185-190 cP. The oligomer, two monomers, optical brightener, and initiator were mixed in an amber jar at room temperature with a lab mixer until the solids were completely dissolved. The rest of the components were then added and mixed until uniform.

TABLE 5

UV-Curable Top Coating Composition

| UV topcoat | Component | EX 9 (wt %) |
|---|---|---|
| Acrylate oligomer | Ebecryl 3720 TM20 (80% Bisphenol-A-epoxy diacrylate oligomer diluted in 20% TMPTA monomer) | 26.00 |
| Acrylate monomer | trimethyol propane triacrylate | 45.33 |
| | Tripropylene glycol diacrylate | 5.00 |
| Photoinitiator | Benzophenone | 15.00 |

TABLE 5-continued

UV-Curable Top Coating Composition

| UV topcoat | Component | EX 9 (wt %) |
|---|---|---|
| Cure Accelerator | methyldiethanol amine (MDEA) | 7.00 |
| Additive | Optical brightener, (OB) | 0.07 |
|  | Paint additive 57 (Dow Chemical) | 1.60 |
|  | Total | 100.00 |

The components of a water-based UV-curable colorant and water-based UV-curable top coating composition are described in Table 6. The components were added in sequence, as listed in Table 6, in an amber glass jar using a lab mixer. Each component was added while mixing to avoid precipitation or crashing out the emulsion. This was then stored in an amber jars for storage.

TABLE 6

Water-based UV-curable Colorant and Water-based UV-curable Top Coating Composition

| WB UV topcoat | Component | Ex 10 (wt %) | Ex 11 (wt %) |
|---|---|---|---|
| Acrylate polymer dispersion | LUX484 (Alberdingk Boley) | 55.21 | 91.50 |
| Photoinitiator | Liquid mixture of benzophenone and 1-hydroxy-cyclohexyl-phenyl-ketone | 1.21 | 2.00 |
|  | Irgacure 819W | 0.91 | 1.50 |
| Additive | BYK 333 flow additive | 1.21 | 2.00 |
|  | BYK349 wetting additive | 1.21 | 2.00 |
|  | Isopropyl alcohol | 0.60 | 1.00 |
|  | Water-Deionized | 15.09 |  |
|  | RD6210 red pigment dispersion (Spectrachem) | 19.62 |  |
|  | RYL6832 yellow pigment dispersion (Spectrachem) |  | 4.95 |
|  | Total | 100.00 | 100.00 |
|  | Viscosity: #1 Spindle, 60 rpm | 12-14 cps | 24-26 cps |
|  | % Solid | 38-40% | 40-42% |

On clay treated paper substrate, various combinations of metallic coating, colorants and UV curable top coating and water-based UV curable top coating were applied. As indicated in Table 7, each layer was applied successively and then fully cured before applying the next layer. The gloss of each finish was then measured and reported in Table 7. All samples were coated with a wire-wound rod #4, unless otherwise noted (#2.5 wire-wound rod was used for UV topcoat). The metallic coating and the UV coatings were both cured at 100 mJ/cm$^2$; and the water based composition was first dried at 60-70° C. for 20 seconds and then cured at 100 mJ/cm$^2$.

TABLE 7

Gloss Measurements on Various Coating Finishes

| Clay Treated Paper Substrate | 20 degree Gloss (GU) | 60 degree Gloss (GU) | Appearance |
|---|---|---|---|
| 1. UV curable metallic coating (EX 5) | 101-130 | 276-279 | Lustrous metallic finishes |
| 1. UV curable top coating (Ex 9) | 80-83 | 98-98.9 | Typical UV topcoat appearance |
| 1. UV curable metallic coating (EX 5) 2. UV curable top coating (Ex 9) | 117-129 | 172-175 | Still lustrous metallic finishes |
| 1. UV curable metallic coating (EX 5) 2. Water-based Red Colorant (EX 10) | 11-16 | 58-65 | Metallic red but with typical lower gloss of water based inks partly due to pigment loading |
| 1. UV curable metallic coating (EX 5) 2. Water-based Red Colorant (EX 10) 3. UV curable top coating (EX 9) | 78-82 | 103-104 | Regained shinny metallic red with the UV top coat |
| 1. Water-based UV Top coating (EX 11) | 22-24 | 68-71 | Slightly higher gloss than a typical water based coating. |
| 1. UV curable metallic coating (EX 5) 2. Water-based UV-curable top coating (EX 11) | 64-85 | 160-167 | Regained shinny metallic with Water-based UV top coating |

The application of the UV curable top coating or water-based UV curable top coating on cured UV curable metallic coating resulted in a metallic finish. While the application of a water-based colorant decreased the gloss level, application of a UV top coating increased gloss of the entire system.

To demonstrate plastic substrate coated with a UV curable metallic coating composition, Example 12 was combined in similar fashion to Example 5. Acrylate oligomer, acrylate monomers, photoinitiators, cure accelerator, and additive were combined in a stainless steel container, and mixed with a lab mixer at 40-50° C. until the mixture became uniform. After cooling to room temperature, metal flakes and solvent were added and mixed until uniform.

TABLE 8

| UV-curable Metallic Composition | | |
|---|---|---|
| | Component | Ex 12 (wt %) |
| Acrylate oligomer | Polyester acrylate oligomer (CN2298 from Sartomer) | 19.93 |
| Acrylate monomer | Hexanediol diacrylate | 22.86 |
| | Trimethylolpropane triacrylate | 4.28 |
| Photoinitiator | 1-hydroxy-cyclohexyl-phenyl-ketone | 4.28 |
| | Eutectic mixture of benzophenone and methyl benzophenone | 2.86 |
| | Ethyl (2,4,6-trimethylbenzoyl) phenylphosphinate | 4.29 |
| Cure Accelerator | Ethyl 4-(dimethylamino) benzoate | 1.43 |
| Additive | Hydroquinone monomethyl ether | 0.35 |
| Metal Flake #1 | Leafing PVD aluminum 20% dispersed in ethoxylated trimethyol propane triacrylate | 6.86 |
| Metal Flake #2 | Leafing PVD aluminum flake, 8% dispersed in propoxylated (2) neopentyl glycol diacrylate | 32.86 |
| | Sub-Total | 100.00 |
| Solvent | Isopropyl alcohol | 57.00 |
| | Total | 157.00 |
| | % Solid | 62-64% |
| | % Aluminum per total solid* | 6.34% |
| | Viscosity: #1 spindle, 60 rpm | 22-24 cps |

*Aluminum wt % was calculated based on the total weight of the composition, excluding solvent On corona treated polyethylene terephalate substrate, various combinations of metallic coating, colorants, UV curable top coating, and water-based UV curable top coating were applied. As indicated in Table 9, each layer was applied successively using wire wound rod #4 and then fully cured before applying the next layer. Each sample was applied on to a substrate with a wire wound rod #4, dried at 60-80° C. for 20 seconds, and cured at 400 mJ/cm².

The gloss of each finish was then measured and reported in Table 9. The following is a low viscosity composition for low viscosity applicator of for low coating thickness.

TABLE 9

| | Plastic Substrate | | | |
|---|---|---|---|---|
| Corona treated PET | 20 degree Gloss (GU) | 60 degree Gloss (GU) | Cross-hatch tape adhesion | Comment |
| 1. UV-curable metallic composition (EX 12) | 144-149 | 235-242 | 100% | Lustrous metallic finishes |
| 1. UV-curable metallic composition (EX 12) 2. Water-based UV curable top coating (EX 11) | 112-118 | 165-170 | 95-100% | Good shinny metallic color |
| 1. UV-curable metallic composition (EX 12) 2. UV curable top coating (EX 9) diluted with 24% isopropyl alcohol (viscosity: 20-22 cps) | 139-146 | 167-171 | 60% | Good shinny metallic color |

The measured gloss values in Table 9 exceeded 160 GU, even with the inks and top coats. The cross-hatch tape adhesion test (tested in accordance with ASTM D3359) indicates that Example 12 alone, and Example 11 coated on top of cured Example 12 had good adhesion (100% as having no coating flake off). Due to the high cross-hatch tape adhesion rating, the UV-curable metallic composition may be used alone, even without the top coating for protecting the metal flakes. The solvent UV topcoat diluted with isopropyl alcohol showed degraded adhesion due to high shrinkage crosslinking of low molecular weight oligomer and monomer. The water based UV top coat on the cured UV-curable metallic composition, however, exhibited lower shrinkage, and may be attributed to the higher molecular weight polymer emulsion of the water-based top coat.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

I claim:

1. A one-part UV-curable metallic decorative composition comprising:
    (A) a plurality of a leafing metallic pigment particle;
    (B) an acrylate oligomer selected from the group consisting of bisphenol-A epoxy diacrylate, aromatic urethane acrylate, aliphatic urethane diacrylate, polyester acrylate, and mixtures thereof;
    (C) an initiator; and
    (D) a cure accelerator that is a tertiary amine with a structure of $R^1R^2N$—Y;
    wherein $R^1$ and $R^2$ are independently, an aliphatic and/or aromatic substituent, and Y is an electron withdrawing substituent.

2. The UV-curable metallic decorative composition of claim 1 wherein the Y is a substituted benzene substituent with an electron withdrawing group.

3. The UV-curable metallic decorative composition of claim 1 wherein the Y is a benzoate.

4. The UV-curable metallic decorative composition of claim 1 wherein the leafing metallic pigment particle is selected from the group consisting of aluminum, copper, zinc, gold, nickel, titanium, stainless steel and alloys thereof.

5. The UV-curable metallic decorative composition of claim 1 wherein the leafing metallic pigment particle is in the form of a flake or platelet.

6. The UV-curable metallic decorative composition of claim 5 wherein the leafing metallic pigment particle is prepared by a conventional ball mill, a physical vapor deposition or a vacuum metallized process.

7. The UV-curable metallic decorative composition of claim 1 wherein the photoinitiator is selected from the group consisting of benzophenone, 2-hydroxy-2-methyl-1-phenyl-1-propanone; 1-hydroxy-cyclohexyl-phenyl-ketone; 2,2-dimethoxy-2-phenyl acetonephenenone/benzyldimethyl ketal; 2,4,6-trimethylbenzoyl phosphine oxide; ethyl (2,4,6-trimethylbenzoyl) phenylphosphinate; phenyl bis(2,4,6-trimethyl benzoyl) phosphine oxide; a 20/80 blend of phenyl bis(2,4,6-trimethyl benzoyl) phosphine oxide and a phosphine oxide derivatives; a mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester; isopropylthioxanthone; bis(p-(N,N-dimethylamino) phenyl)ketone; oligo [2-hydroxy-2-methyl-1-[4-(1-methylvinyl) phenyl]propanone]; 1-propanone,1-[4-[(4-benzoylphenyl)thio]phenyl]-2-methyl-2-[(4-methylphenyl)sulfonyl];2-(4-Methylbenzyl)-2-dimethylamino-1-(4-morpholinophenyl)-1-butanone; polybutyleneglycol bis(9-oxo-9H-thioxanthenyloxy)acetate; diester of carboxymethoxy thioxanthone and polytetramethyleneglycol 250; and mixtures thereof.

8. The UV-curable metallic decorative composition of claim 1 wherein the cure accelerator is selected from the group consisting of ethyl 4-(dimethylamino) benzoate, 2-ethylhexyl-4-(dimethylamino) benzoate, ethyl 2-(dimethylamino) benzoate, n-butoxyethyl 4-(dimethylamino) benzoate; poly[oxy(methyl-1,2-thanediyl)], α-[4-(dimethylanlino)benzyl-ω-butoxy; poly(ethyleneglycol) bis(p-dimethylamino benzoate); 1,3-di({α-4-(dimethylamino) benzoylpoly[oxy(1-methylethylene)]}oxy)-2,2-bis ({α-4-(dimethylamino)-benzoylpoly[oxy(1-methylethylene)]}oxymethyl) propane;{α-4-dimethylamino)benzoylpoly(oxyethylene)-poly [oxy(1-methylethylene)]-poly (oxyethylene)}4-dimethyl-amino)benzoate; a polymeric aminobenzoate derivative; and mixtures thereof.

9. The UV-curable decorative coating composition of claim 1 further comprising at least one of an antioxidant, stabilizer, anti-misting agent, filler, slip agent, dye, optical brightener, and solvent.

10. A method of fabricating a metallic-finish article comprising the steps of:
(i) applying a one-part UV-curable metallic decorative composition comprising
(A) a plurality of leafing metallic pigment particle;
(B) an acrylate oligomer and/or an acrylate monomer;
(C) an initiator; and
(D) a cure accelerator that is a tertiary amine with a structure of $R^1R^2N—Y$ wherein $R^1$ and $R^2$ are independently, an aliphatic and/or aromatic substituent, and Y is an electron withdrawing substituent on a substrate;
(ii) UV curing the UV-curable metallic decorative composition;
(iii) applying a UV-curable top coating composition on a top surface of the cured metallic composition; and
(iv) UV-curing the UV-top coating composition;
wherein the gloss level of the cured metallic decorative composition is greater than 190 GU measured at 60 degree angle in accordance with ASTM D523, D2457, DIN 67530 or JIS Z8741.

11. The method of fabricating a metallic-finish article of claim 10, wherein the UV-curable top coating composition comprises:
(1) a water-dispersible acrylate oligomer, water-emulsified acrylate oligomer, water-emulsified acrylate oligomer or mixtures thereof;
(2) a photoinitiator that is compatible with the acrylate oligomer/polymer; and
(3) optionally, an additive selected from the group consisting of a wetting agent, a defoamer, an optical brightener, an antioxidant, a slip agent, a dye, a pigment dispersion and mixtures thereof.

12. The method of fabricating a metallic-finish article of claim 11 wherein the water-dispersible acrylate oligomer contains a repeating ethoxylated unit —$(CH_2CH_2O)n$— or an ionic functional group.

13. The method of fabricating a metallic-finish article of claim 11 wherein the water-emulsified acrylate oligomer or water-emulsified acrylate oligomer has a structure of

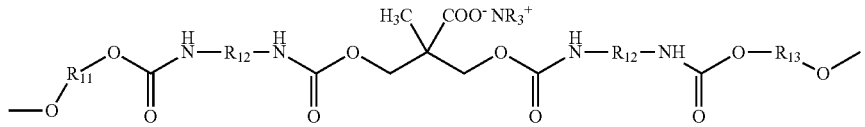

wherein $R_{11}$ is selected from the group consisting of polyester acrylate, epoxy acrylate and polyether acrylate, $R_{12}$ is a diisocyaante, $R_{13}$ is a dial.

14. The method of fabricating a metallic-finish article of claim 11 wherein the photoinitiator is selected from the group consisting of 2-hydroxy-2-methyl-1-phenyl-1-propanone, benzophenone, 1-hydroxy-cyclohexyl-phenyl-ketone, 2,4,6-trimethylbenzoyl phosphine oxide; 2-hydroxy-2-methyl-1-phenyl-1-propanone; phenyl bis(2,4,6-trimethyl benzoyl) phosphine oxide; oxy-phenyl-acetic acid 2-[2-oxo-2-phenyl-acetoxy-ethoxy]-ethyl ester; oxy-phenyl-acetic acid 2-[2-hydroxy-ethoxy]-ethyl ester; ethyl (2,4,6-trimethylbenzoyl) phenylphosphinate; and mixtures thereof.

15. The method of fabricating a metallic-finish article of claim 10 wherein the gloss level of the article greater than 160 GU measured at a 60 degree angle in accordance with ASTM D523, D2457, DIN 67530 or JIS Z8741.

16. An article comprising the UV-curable metallic decorative composition of claim 1 on a surface of a substrate.

17. The article of claim 16 wherein the substrate is paper, plastic film, wood, composite wood or metal.

18. The article of claim 17 wherein the paper is a clay-coated paper, a clay-coated paperboard, a primer-sealed paper or a primer-sealed paperboard.

19. The article of claim 17 wherein the plastic film is a polypropylene, polystyrene, polyvinylchloride, polycarbonate, polyethylene, polyethylene terephthalate or acrylic film.

20. The article of claim 16 which is UV cured and the gloss level of the UV cured metallic decorative composition is greater than 190 GU measured at a 60 degree angle in accordance with ASTM D523, D2457, DIN 67530 or JIS Z8741.

21. The article of claim 16 further comprising a UV-curable top coating composition.

22. The article of claim 21 wherein the UV-curable top coating composition comprises (1) a water-dispersible acrylate oligomer, water-emulsified acrylate oligomer, water-emulsified acrylate oligomer or a mixture thereof; (2) a photoinitiator that is compatible with the acrylate oligomer/polymer; and optionally, (3) an additive selected from the group consisting of wetting agent, defoamers, dye and pigment dispersions.

23. The article of claim 22 wherein the UV-curable top coating composition is cured, and the gloss level of the article is greater than 160 GU measured at a 60 degree angle in accordance with ASTM D523, D2457, DIN 67530 or JIS Z8741.

24. A method of fabricating a metallic-finish article comprising the steps of:
(i) applying the UV-curable metallic decorative composition of claim 1 on a substrate and
(ii) UV curing the UV-curable metallic decorative composition;
wherein the gloss level of the cured metallic decorative composition is greater than 190 GU measured at 60 degree angle in accordance with ASTM D523, D2457, DIN 67530 or JIS Z8741.

* * * * *